United States Patent
Liu et al.

(10) Patent No.: US 10,158,851 B2
(45) Date of Patent: Dec. 18, 2018

(54) TECHNIQUES FOR IMPROVED GRAPHICS ENCODING

(75) Inventors: Qi Liu, Beijing (CN); Xianchao Xu, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 71 days.

(21) Appl. No.: 13/977,046

(22) PCT Filed: Jun. 21, 2012

(86) PCT No.: PCT/CN2012/077344
§ 371 (c)(1),
(2), (4) Date: Jun. 28, 2013

(87) PCT Pub. No.: WO2013/189077
PCT Pub. Date: Dec. 27, 2013

(65) Prior Publication Data
US 2014/0192071 A1    Jul. 10, 2014

(51) Int. Cl.
| | | |
|---|---|---|
| G06T 15/00 | (2011.01) | |
| H04N 19/85 | (2014.01) | |
| G06F 3/14 | (2006.01) | |
| G06T 9/00 | (2006.01) | |
| H04N 19/176 | (2014.01) | |
| H04N 19/51 | (2014.01) | |

(52) U.S. Cl.
CPC ......... *H04N 19/00903* (2013.01); *G06F 3/14* (2013.01); *G06T 9/00* (2013.01); *H04N 19/176* (2014.11); *H04N 19/51* (2014.11); *H04N 19/85* (2014.11)

(58) Field of Classification Search
CPC ..... G06F 3/14; G09G 5/39–5/399; G06T 1/60
See application file for complete search history.

(56) References Cited

U.S. PATENT DOCUMENTS

| | | | | |
|---|---|---|---|---|
| 5,995,080 A | * | 11/1999 | Biro et al. ..................... | 345/603 |
| 6,614,442 B1 | * | 9/2003 | Ouyang et al. ............... | 345/545 |
| 7,287,099 B1 | * | 10/2007 | Powderly .............. | G06F 13/385 |
| | | | | 345/537 |
| 7,577,917 B2 | * | 8/2009 | Vong ............................. | 715/767 |

(Continued)

FOREIGN PATENT DOCUMENTS

JP    2007295130 A    11/2007

OTHER PUBLICATIONS

International Search Report and Written Opinion dated Mar. 21, 2013 for corresponding PCT/CN2012/077344 filed Jun. 21, 2012 (nine (9) pages).

*Primary Examiner* — Charles Tseng

(57) ABSTRACT

Techniques for improved graphics encoding are described. In one embodiment, for example, a device may include a processor circuit and a graphics encoding module, and the graphics encoding module may be operative to receive graphics buffer update information identifying one or more of a plurality of regions of a graphics buffer, the identified one or more regions including updated graphics information, retrieve the updated graphics information from the identified one or more regions of the graphics buffer, encode the updated graphics information, and transmit the encoded updated graphics information. Other embodiments are described and claimed.

21 Claims, 9 Drawing Sheets

(56) References Cited

U.S. PATENT DOCUMENTS

| | | |
|---|---|---|
| 8,638,846 B1* | 1/2014 | Cosatto et al. .......... 375/240.01 |
| 8,824,560 B2* | 9/2014 | Bakke ...................... 375/240.24 |
| 2003/0217360 A1* | 11/2003 | Gordon et al. ................. 725/54 |
| 2009/0167775 A1* | 7/2009 | Lu et al. ....................... 345/547 |
| 2009/0289947 A1 | 11/2009 | Hsu |
| 2011/0193739 A1* | 8/2011 | Strauch ................... G01S 7/006 342/146 |
| 2012/0120320 A1* | 5/2012 | Chowdhry et al. ........... 348/586 |
| 2012/0127185 A1* | 5/2012 | Chowdhry et al. ........... 345/531 |
| 2013/0148740 A1* | 6/2013 | Samanta Singhar .... 375/240.24 |

* cited by examiner

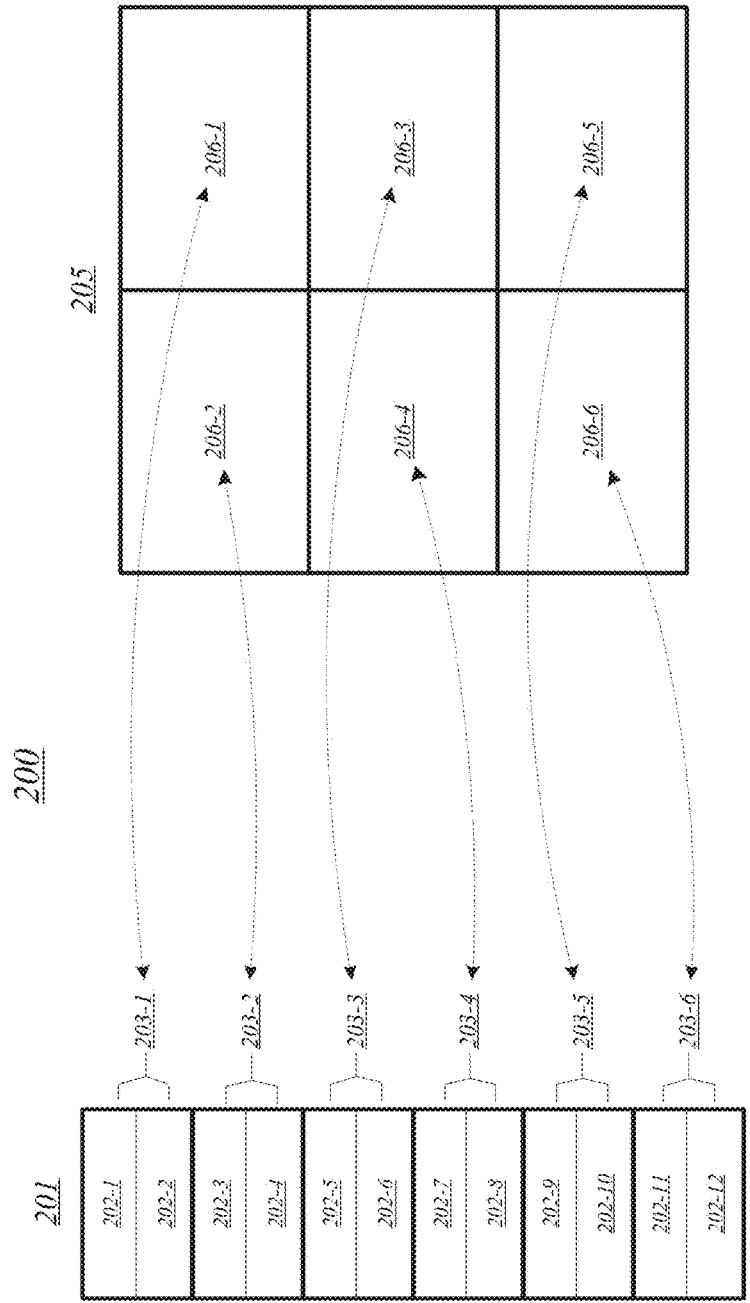

TECHNIQUES FOR IMPROVED GRAPHICS ENCODING

BACKGROUND

In some traditional computing systems, the rendering of graphics on a display may involve encoding graphics information into a suitable format prior to transmission to the display. For example, in a computing system implementing a wireless remote display technique, graphics information stored in a graphics frame buffer may be converted into a frame and macroblock-based format, and encoded based on that format, in order to reduce the bandwidth requirements associated with wireless transmission of the graphics information. However, this encoding may be computationally intensive, and thus by improving its efficiency, improvements in performance, reductions in power consumption, and reductions in bandwidth consumption may be realized. Accordingly, techniques for improving the efficiency of pre-transmission encoding of graphics information are desirable.

BRIEF DESCRIPTION OF THE DRAWINGS

FIG. 2A illustrates a first embodiment of an encoding correspondence.

DETAILED DESCRIPTION

Various embodiments may be generally directed to techniques for improved graphics encoding. In one embodiment, for example, a device may include a processor circuit and a graphics encoding module, and the graphics encoding module may be operative to receive graphics buffer update information identifying one or more of a plurality of regions of a graphics buffer, the identified one or more regions including updated graphics information, retrieve the updated graphics information from the identified one or more regions of the graphics buffer, encode the updated graphics information, and transmit the encoded updated graphics information. In this manner, performance of the device may be improved and power consumption and bandwidth consumption of the device may be reduced. Other embodiments may be described and claimed.

Various embodiments may include one or more elements. An element may include any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment. Furthermore, aspects or elements from different embodiments may be combined.

Figure 1:
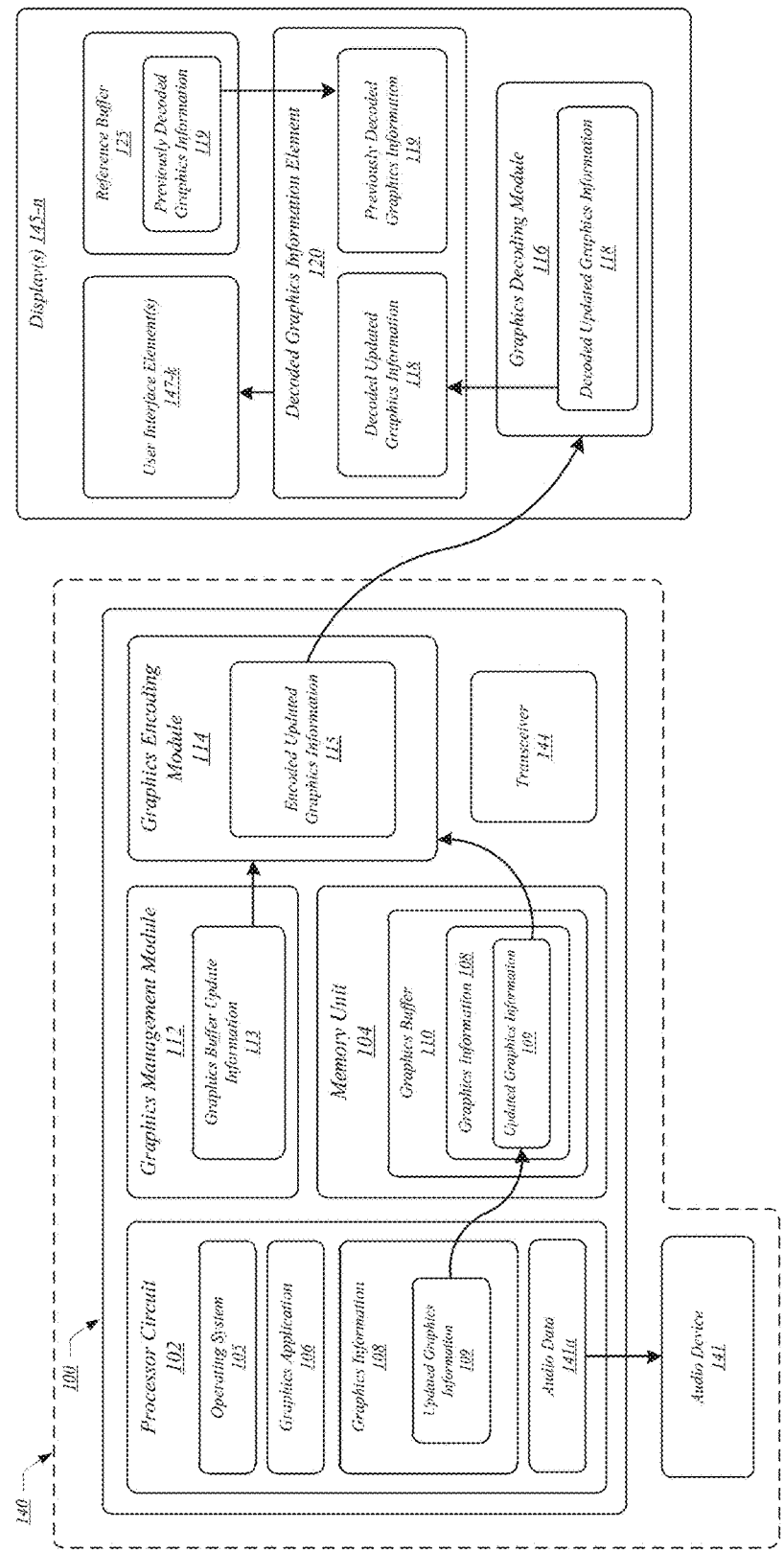
FIG. 1 illustrates one embodiment of a device and one embodiment of a first system.

FIG. 1 illustrates a block diagram of a device 100. As shown in FIG. 1, device 100 includes multiple elements including a processor circuit 102, a memory unit 104, a graphics management module 112, a graphics encoding module 114, and a transceiver 144. The embodiments, however, are not limited to the type, number, or arrangement of elements shown in this figure.

In various embodiments, device 100 may include processor circuit 102. Processor circuit 102 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 102 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 102 may be implemented as a general purpose processor, such as a processor made by Intel® Corporation, Santa Clara, Calif. The embodiments are not limited in this context.

In some embodiments, device 100 may include or be arranged to communicatively couple with a memory unit 104. Memory unit 104 may be implemented using any machine-readable or computer-readable media capable of storing data, including both volatile and non-volatile memory. For example, memory unit 104 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 104 may be included on the same integrated circuit as processor circuit 102, or alternatively some portion or all of memory unit 104 may be disposed on an integrated circuit or other medium, for example a hard disk drive, that is external to the integrated circuit of processor circuit 102. Although memory unit 104 is included within device 100 in FIG. 1, memory unit 104 may be external to device 100 in some embodiments. The embodiments are not limited in this context.

In various embodiments, processor circuit 102 may be operative to execute an operating system 105. Operating system 105 may contain, communicate, generate, obtain, and provide program component, system, user, and data communications, requests, and responses, and may be operative to facilitate interaction with and/or interaction between various hardware and/or software components, such as communications networks, network interfaces, data, I/O, peripheral devices, storage devices, program components, memory devices, user input devices, and the like. Operating system 105 may include programming logic operative to utilize and/or control one or more hardware and/or software elements of device 100. For example, operating system 105 may be operative to receive input through one or more input devices, to receive information from one or more external devices through one or more communications channels, to generate instructions for transmission to one or more elements of device 100 and/or one or more external devices, and/or to implement one or more applications. Operating system 105 may also provide communications protocols that allow device 100 to communicate with other entities through a communications network, such as multicast, TCP/IP, UDP, unicast, and the like. Examples of operating system 105 include, but are not limited to, Apple Macintosh OS, Apple Macintosh OS X (Server), AT&T Plan 9, Be OS, IBM OS/2, Microsoft DOS, Microsoft Windows 2000/2003/3.1/95/98/7, Microsoft Windows CE/Millenium/NT/Vista/XP, Palm OS, Unix, a Unix-like system distribution (such as AT&T's UNIX, a Berkley Software Distribution (BSD) variation such as FreeBSD, NetBSD, or OpenBSD, or a Linux distribution such as Red Hat or Ubuntu), or a like operating system. The embodiments are not limited in this context.

In some embodiments, processor circuit 102 may be operative to execute a graphics application 106. Graphics application 106 may include any application featuring graphics capabilities, such as, for example, an image or video viewing application, an image or video playback application, a streaming video playback application, a multimedia application program, a system program, a conferencing application, a gaming application, a productivity application, a messaging application, an instant messaging (IM) application, an electronic mail (email) application, a short messaging service (SMS) application, a multimedia messaging service (MMS) application, a social networking application, a web browsing application, and so forth. The embodiments are not limited in this context.

In various embodiments, device 100 may be arranged to communicatively couple with one or more displays 145-n. It is worthy of note that "n" and similar designators as used herein are intended to be variables representing any positive integer. Thus, for example, if an implementation sets a value for n=3, then a complete set of displays 145-n may include displays 145-1, 145-2, and 145-3. Display(s) 145-n may include any device(s) capable of displaying one or more user interface elements 147-k or one or more other images. User interface elements 147-k may include any visual or optical sensory effect(s) such as, for example, images, pictures, video, text, graphics, menus, textures, and/or patterns. Examples for display(s) 145-n may include a television, a monitor, a projector, and a computer screen. In one embodiment, for example, display(s) 145-n may be implemented by liquid crystal display (LCD) displays, light emitting diode (LED) displays, or other types of suitable visual interfaces. Display(s) 145-n may include, for example, touch-sensitive color display screens. In some implementations, display(s) 145-n may include one or more thin-film transistors (TFT) LCD including embedded transistors. The embodiments are not limited in this context.

In various embodiments, operating system 105 and/or graphics application 106 may be operative to generate graphics information 108. Graphics information 108 may include data, information, or logic corresponding to one or more user interface elements 147-k. The data, information, or logic included within graphics information 108 may be usable by device 100 and/or one or more elements external to device 100 to cause user interface elements 147-k or one or more other images to be displayed by one or more displays 145-n. The embodiments are not limited in this context.

In some embodiments, device 100 may include a graphics management module 112. Graphics management module 112 may include a graphics process manager, graphics driver, or other graphics implementation logic in various embodiments. In various embodiments, graphics management module 112 may be implemented by operating system 105, and may be operative on behalf of operating system 105 to implement the display of user interface elements 147-k associated with a user interface of operating system 105 or with graphics application 106. The embodiments are not limited in this respect.

In some embodiments, device 100 may include a graphics encoding module 114. Graphics encoding module 114 may include a graphics and/or video encoder in various embodiments. Examples of graphics encoding module 114 may include but are not limited to a graphics encoding microchip or card, graphics encoding circuitry integrated into a multi-purpose microchip or card, and a graphics encoder implemented as software. In various embodiments, graphics encoding module 114 may be operative to encode graphics information 108 into a format suitable for transmission to display(s) 145-n. The embodiments are not limited in this respect.

In some embodiments, device 100 may include a transceiver 144. Transceiver 144 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, transceiver 144 may operate in accordance with one or more applicable standards in any version. The embodiments are not limited in this context.

FIG. 1 may also illustrate a block diagram of a system 140 in various embodiments. System 140 may include any of the aforementioned elements of device 100. System 140 may further include an audio device 141 in some embodiments. Audio device 141 may include any device capable of generating tones, music, speech, speech utterances, sound effects, background noise, or other sounds based on received audio data. Examples of audio device 141 may include a speaker, a multi-speaker system, a home entertainment system, a television, a consumer appliance, a computer system, a mobile device, and a portable electronic media device, among other examples. The embodiments are not limited in this context.

In various embodiments, audio device 141 may be arranged to generate tones, music, speech, speech utterances, sound effects, background noise, or other sounds based on audio data 141a received from device 100. In some embodiments, audio data 141a may be generated by processor circuit 102, in conjunction with operating system 105 and/or graphics application 106. The embodiments are not limited in this context.

In general operation, device 100 and/or system 140 may be operative to iteratively generate encoded updated graphics information 115 and transmit encoded updated graphics information 115 to display(s) 145-*n*. Display(s) 145-*n* may be operative to iterative encoded updated graphics information 115 and render user interface element(S) 147-*k* and/or one or more other images based in whole or in part on encoded updated graphics information 115. The embodiments are not limited in this context.

In some embodiments, memory unit 104 may include graphics buffer 110. Graphics buffer 110 may configured to store graphics information 108 such that at a given point in time, the graphics information 108 stored in graphics buffer 110 identifies the effects to be rendered on display(s) 145-*n* following a next read of the graphics information 108 from graphics buffer 110. In other words, graphics buffer 110 may include a complete description of the effects to be rendered on display(s) 145-*n* at a subsequent point in time. For example, in an embodiment in which device 100 and/or system 140 is communicatively coupled to a display 145-1 including an LCD screen, graphics buffer 110 may include graphics information 108 specifying the effects to be rendered on the LCD screen at a subsequent point in time. The embodiments are not limited in this context.

In various embodiments, particular regions within graphics buffer 110 may correspond to particular regions on display(s) 145-*n*, based on one or more graphics information correspondences. In an example graphics information correspondence, a particular region in graphics buffer 110 may correspond to a particular region on a display 145-1, such that the graphics information 108 stored in the particular region of the graphics buffer 110 defines the visual effects that will be rendered in the particular region of the display 145-1. In some embodiments, graphics management module 112 and/or graphics encoding module 114 may use one or more graphics information correspondences to identify one or more regions of graphics buffer 110 based on one or more identified regions on display(s) 145-*n*. The embodiments are not limited in this context.

In various embodiments, operating system 105 and/or graphics application 106 may be operative to generate updated graphics information 109. Updated graphics information 109 may correspond to changes in the graphics information 108 to be stored in graphics buffer 110. These changes may in turn correspond to changes in the user interface element(s) 147-*k* or one or more other images to be displayed on display(s) 145-*n* from one point in time to a subsequent point in time. In one example, operating system 105 may implement a user interface on display(s) 145-*n*, and updated graphics information 109 may correspond to movement of a cursor within that user interface. In another example, graphics application 106 may be operative to display a video on display(s) 145-*n*, and updated graphics information 109 may correspond to changes in the displayed video. The embodiments are not limited to these examples.

In some embodiments, graphics management module 112 may be operative to generate graphics buffer update information 113. Graphics buffer update information 113 may include information identifying one or more regions of graphics buffer 110 that include updated graphics information 109. Graphics management module 112 may generate graphics buffer update information 113 based on updated graphics information 109 and one or more graphics information correspondences identifying regions of graphics buffer 110 corresponding to regions on display(s) 145-*n* affected by updated graphics information 109. In various embodiments, operating system 105 may implement a windowed user interface, and graphics management module 112 may determine that updated graphics information 109 corresponds to a region including an active window within that user interface, and generate graphics buffer updated information 113 identifying regions in graphics buffer 110 corresponding to the active window. The embodiments are not limited in this context.

In some embodiments, graphics encoding module 114 may be operative to receive graphics buffer update information 113 from graphics management module 112, and identify one or more regions on display(s) 145-*n* as corresponding to user interface element(s) 147-*k* and/or one or more other images that have changed, based on the regions of graphics buffer 110 identified in graphics buffer update information 113 and on one or more graphics information correspondences. In various embodiments, graphics encoding module 114 may obtain updated graphics information 109 from graphics buffer 110 and encode updated graphics information 109 to form encoded updated graphics information 115. The embodiments are not limited in this context.

In various embodiments, the encoding of encoded updated graphics information 115 may be frame-based. In some such embodiments, graphics encoding module 114 may be operative to generate a series of encoded updated graphics information 115 corresponding to a series of frames, each frame identifying all effects to be rendered on display(s) 145-*n* at a particular subsequent point in time. As noted above, graphics buffer 110 may be configured to include graphics information 108 identifying all effects to be rendered on display(s) 145-*n* at a particular subsequent point in time. Accordingly, in various embodiments, each frame to which encoded updated graphics information 115 generated by graphics encoding module 114 corresponds may in turn correspond to the contents of graphics buffer 110 at the time that frame is generated, and both may correspond to a set of effects to be rendered on display(s) 145-*n*. In various embodiments, encoded updated graphics information 115 corresponding to a particular frame may describe regions within the particular frame that have changed with respect to a previous frame. The embodiments are not limited in this context.

In some embodiments, the encoding of encoded updated graphics information 115 may be frame and macroblock-based. In various such embodiments, each frame may be divided into a plurality of macroblocks, and the macroblocks of each frame may correspond to particular regions on display(s) 145-*n*. As noted above, particular regions in graphics buffer 110 may also correspond to particular regions on display(s) 145-*n*. A given macroblock that corresponds to a given region on display(s) 145-*n* may also be said to correspond to the particular regions in graphics buffer 110 that correspond to those regions on display(s) 145-*n*. Such a correspondence between a macroblock and region(s) in graphics buffer 110 may be referred to as encoding correspondence. In various embodiments, graphics encoding module 114 may be operative to receive graphics buffer update information 113 identifying one or more regions of graphics buffer 110 that contain updated graphics information 109, determine one or more changed macroblocks based on one or more encoding correspondences, and generate encoded updated graphics information 115 corresponding to the changed macroblocks. In some embodiments, graphics encoding module 114 may be operative to generate encoded updated graphics information 115 corresponding to changed macroblocks based on both updated graphics information 109 and additional graphics information 108 in graphics buffer 110 that has not changed since a previous frame. The embodiments are not limited in this context.

In various embodiments, graphics encoding module 114 may encode graphics information 108 based on an interframe comparison. The interframe comparison may include a comparison of a current frame corresponding to the contents of graphics information 108 with a previously generated frame. More particularly, graphics encoding module 114 may encode graphics information 108 based on differences between the current frame and the previous frame. In some embodiments, this comparison may be conducted on a macroblock-by-macroblock basis. For example, in various embodiments, graphics encoding module 114 may compare each macroblock of the current frame with a corresponding macroblock of the previous frame, and encode the graphics information 108 corresponding to each macroblock of the current frame based on the differences between that macroblock and the corresponding macroblock in the previous frame. In some embodiments, in accordance with one or more standards such as the aforementioned H.264/ISO/IEC 14496-10:2012 standards, graphics encoding module 114 may calculate one or more motion vectors, each motion vector corresponding to a comparison between a macroblock in a current frame and a corresponding macroblock in a previous frame. In various embodiments, encoded updated graphics information 115 may contain one or more encoded updated macroblocks. The embodiments are not limited in this context.

In some embodiments, device 100 and/or system 140 may be operative to transmit encoded updated graphics information 115 to display(s) 145-n. In some embodiments, display(s) 145-n may include wireless displays, and encoded updated graphics information 115 may be transmitted to display(s) 145-n over one or more wireless connections. In some such embodiments, the one or more wireless connections may be established using transceiver 144. In various embodiments, display(s) 145-n may include one or more wireless displays operating according to one or more wireless display specifications, and device 100 and/or system 140 may be operative to transmit encoded updated graphics information 115 in accordance with the one or more wireless display specifications. For example, in some embodiments, displays 145-n may include one or more wireless displays implementing Intel® Wireless Display (WIDI) technology. In various such embodiments, the one or more wireless display specifications may specify one or more formats in which encoded updated graphics information 115 may be encoded. For example, in some embodiments, encoded updated graphics information 115 may include encoded macroblocks according to the ITU-T H.264 standard published Apr. 4, 2012, the ISO/IEC 14496-10:2012 standard published Apr. 26, 2012, and/or any previous version of these standards. In various embodiments, encoded updated graphics information 115 may be transmitted to display(s) 145-n over one or more wired connections, or over a combination of wired and wireless connections. The embodiments are not limited in this context.

In some embodiments, display(s) 145-n may include or be communicatively coupled to a graphics decoding module 116. Graphics decoding module 116 may include a graphics and/or video decoder in various embodiments. Examples of graphics decoding module 116 may include but are not limited to a graphics decoding microchip or card, graphics decoding circuitry integrated into a multi-purpose microchip or card, and a graphics decoder implemented as software. Although graphics decoding module 116 is shown as being included within display(s) 145-n in FIG. 1, it should be understood that graphics decoding module 116 may be external to display(s) 145-n in some embodiments, and the embodiments are not limited in this context. Graphics decoding module may be operative to receive and decode encoded updated graphics information 115 to form decoded updated graphics information 118. In various embodiments, encoded updated graphics information 115 may include one or more updated encoded macroblocks, and graphics decoding module 116 may decode the updated encoded macroblocks to obtain decoded updated graphics information 118 including one or more updated decoded macroblocks corresponding to the one or more updated encoded macroblocks. The embodiments are not limited in this context.

In various embodiments, display(s) 145-n and/or graphics decoding module 116 may include or be communicatively coupled to a reference buffer 125. Although reference buffer 125 is shown as being included within display(s) 145-n in FIG. 1, it should be understood that reference buffer 125 may be external to display(s) 145-n in some embodiments, and the embodiments are not limited in this context. In some embodiments, reference buffer 125 may include previously decoded graphics information 119. Previously decoded graphics information 119 may include information, data, or logic previously decoded by graphics decoding module 116. For example, previously decoded graphics information 119 may include decoded updated graphics information 118 previously generated by graphics decoding module 116. In some embodiments, previously decoded graphics information 119 may comprise one or more previously decoded macroblocks. In various embodiments, previously decoded graphics information 119 may include a reference frame corresponding to a previous frame that has been rendered by display(s) 145-n, and the reference frame may include a set of previously decoded macroblocks that collectively constitute a complete definition of the visual effects that were rendered on display(s) 145-n at a particular previous point in time as a previous frame. The embodiments are not limited in this context.

In some embodiments, display(s) 145-n and/or graphics decoding module 116 may be operative to combine decoded updated graphics information 118 with previously decoded graphics information 119 to form one or more decoded graphics information elements 120. Each decoded graphics information element 120 may include decoded graphics information that collectively constitute a complete definition of the visual effects to be rendered on display(s) 145-n at a particular subsequent point in time. In various such embodiments, decoded updated graphics information 118 may include one or more updated decoded macroblocks, previously decoded graphics information 119 may include one or more previously decoded macroblocks, and display(s) 145-n and/or graphics decoding module 116 may be operative to combine decoded updated graphics information 118 with previously decoded graphics information 119 to form one or more decoded graphics information elements 120 corresponding to a frame to be rendered on display(s) 145-n at a particular subsequent point in time. The embodiments are not limited in this context.

In various embodiments, display(s) 145-n and/or graphics decoding module 116 may be operative to select previously decoded graphics information 119 and obtain previously decoded graphics information 119 from a reference frame stored in reference buffer 125 based on decoded updated graphics information 118. In some such embodiments, display(s) 145-n and/or graphics decoding module 116 may determine one or more unchanged regions of display(s) 145-n based on decoded updated graphics information 118. In some embodiments, the unchanged regions of display(s) 145-n may include regions of display(s) 145-n to which none of decoded updated graphics information 118 corresponds. In various embodiments, display(s) 145-n and/or graphics decoding module 116 may be operative to retrieve from a reference frame stored in reference buffer 125 one or more previously decoded macroblocks corresponding to the unchanged regions of display(s) 145-$n$ and combine them with one or more updated decoded macroblocks to form one or more decoded graphics information elements 120. The embodiments are not limited in this context.

In some embodiments, decoded graphics information elements 120 may be in a same format as graphics information 108 stored in graphics buffer 110. For example, each decoded graphics information element 120 may comprise a reproduction of the contents of graphics buffer 110 at a particular point in time. As noted above, graphics buffer 110 may configured to store graphics information 108 such that at a given point in time, the graphics information 108 stored in graphics buffer 110 identifies the effects to be rendered on display(s) 145-$n$ following a next read of the graphics information 108 from graphics buffer 110, and thus graphics buffer 110 may include a complete description of the effects to be rendered on display(s) 145-$n$ at a subsequent point in time. In various embodiments, display(s) 145-$n$ and/or graphics decoding module 116 may be operative to cause the effects identified in graphics buffer 110 to be rendered on display(s) 145-$n$ by reproducing the contents of graphics buffer 110 as one or more decoded graphics information elements 120. In some such embodiments, graphics buffer 110 may be a first frame buffer, display(s) 145-$n$ may include or be communicatively coupled to a second frame buffer, and display(s) 145-$n$ and/or graphics decoding module 116 may be operative to generate a decoded graphics information element 120 that contains the graphics information 108 stored in the first frame buffer and store the decoded graphics information element 120 in the second frame buffer. Display(s) 145-$n$ may then render the user interface elements 147-$k$ and/or one or more other images described by the graphics information 108 by reading the decoded graphics information element 120 from the second frame buffer and rendering user interface elements 147-$k$ and/or one or more other images based on its contents. The embodiments are not limited in this context.

Since display(s) 145-$n$ and/or graphics decoding module 116 may obtain previously decoded graphics information 119 from reference buffer 125, they may only require that device 100 and/or system 140 transmit information sufficient for use by display(s) 145-$n$ and/or graphics decoding module 116 to generate decoded updated graphics information 118. In other words, device 100 and/or system 140 may only need to transmit information describing changes in an image, for example, rather than information describing the entire image. As such, for each iteration and/or frame, device 100 and/or system 140 may only need to encode and transmit updated graphics information 109, rather than the entirety of graphics information 108 stored in graphics buffer 110. The reduction in encoding load on device 100 and/or system 140 may result in improvements in performance and reductions in power consumption. Furthermore, by transmitting only encoded updated graphics information 115, device 100 and/or system 140 may realize further reductions in power consumption, as well as reductions in bandwidth consumption. The embodiments are not limited in this context.

FIG. 2A illustrates one embodiment of an encoding correspondence 200. As shown in FIG. 2A, graphics buffer 201 includes a plurality of buffer regions 202-$q$, and frame 205 includes a plurality of macroblocks 206-$s$. Each of the macroblocks 206-$s$ corresponds to a respective subset 203-$r$ of the buffer regions 202-$q$. For example, as shown in FIG. 2A, macroblock 206-1 corresponds to buffer region subset 203-1, and buffer region subset 203-1 includes buffer regions 202-1 and 202-2. According to this correspondence, the graphics information in buffer regions 202-1 and 202-2 defines the visual effects to be rendered within macroblock 206-1. Similarly, macroblocks 206-2, 206-3, 206-4, 206-5, and 206-6 correspond to buffer region subsets 203-2, 203-3, 203-4, 203-5, and 206-6 respectively, and the buffer regions within these subsets define the visual effects to be rendered within their corresponding macroblocks. Collectively, buffer regions 202-$q$ may include a complete definition of the visual effects to be rendered within macroblocks 206-$s$ at a particular point in time. The embodiments are not limited in this context.

Figure 2B:
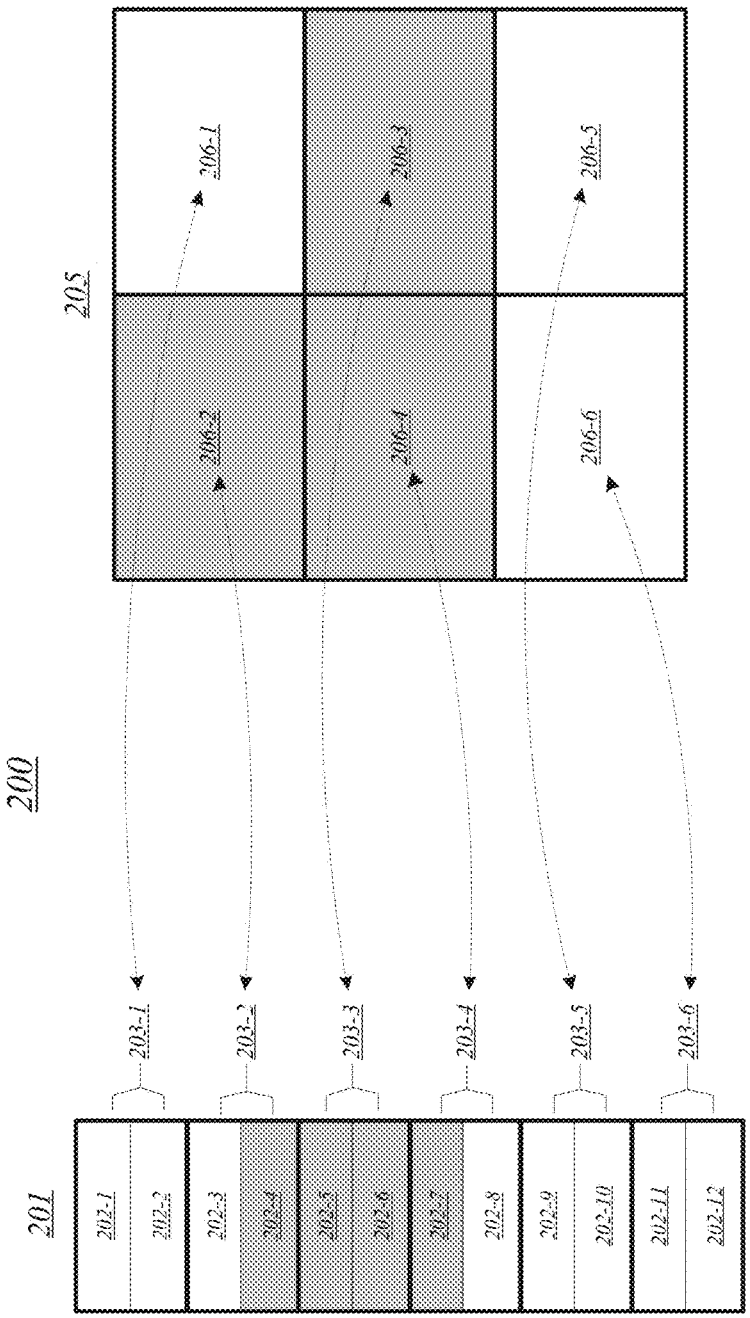
FIG. 2B illustrates a second embodiment of the encoding correspondence.

FIG. 2B includes a second embodiment of encoding correspondence 200, which illustrates the effects on frame 205 of changes in the contents of buffer regions 202-$q$. In FIG. 2B, buffer regions 202-4, 202-5, 202-6, and 202-7 have been shaded in order to indicate that they include updated graphics information 109 that reflects a change in their contents with respect to a previous frame. As shown in FIG. 2B, macroblock 206-3 corresponds to buffer region subset 203-3, which includes buffer regions 202-5 and 202-6. Buffer regions 202-5 and 202-6 include updated graphics information 109, thus indicating that macroblock 206-3 should be among the encoded macroblocks of the encoded updated graphics information 115 for frame 205. Similarly, macroblocks 206-2 and 206-4 correspond to buffer region subsets 203-2 and 203-4 respectively. Buffer region subsets 203-2 and 203-4 both contain buffer regions including update graphics information 109, thus indicating that macroblocks 206-2 and 206-4 should be among the encoded macroblocks of the encoded updated graphics information 115 for frame 205. In contrast, macroblocks 206-1, 206-5, and 206-6 correspond to buffer region subsets 203-1, 203-5, and 203-6 respectively. Buffer region subsets 203-1, 203-5, and 203-6 do not include updated graphics information 109, thus indicating that macroblocks 206-1, 206-5, and 206-6 need not be re-encoded, and that previously decoded graphics information 119 including previous decoding results for these macroblocks may be incorporated into a decoded graphics information element 120 by display(s) 145-$n$ and/or graphics decoding module 116 instead. The embodiments are not limited in this context.

Figure 3:
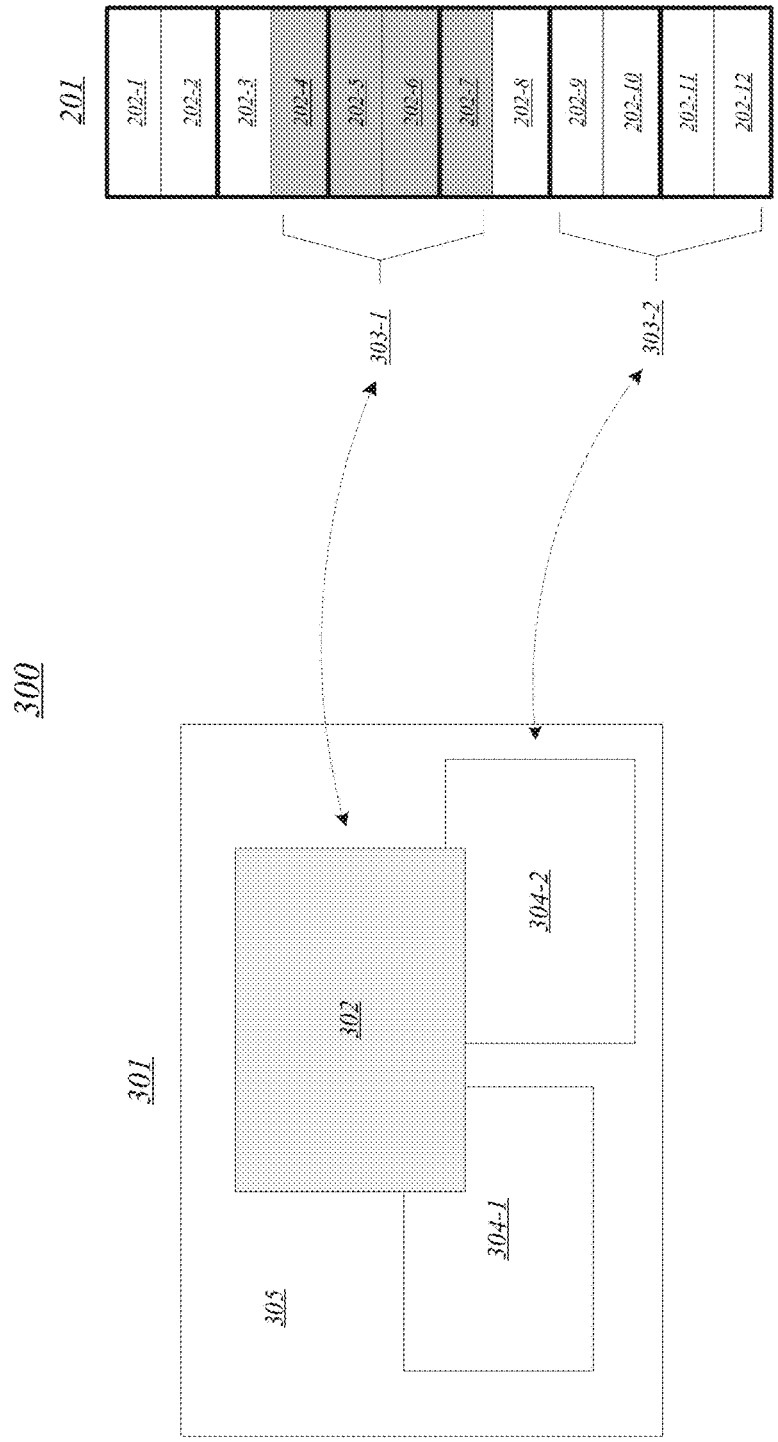
FIG. 3 illustrates one embodiment of a graphics information correspondence.

FIG. 3 illustrates one embodiment of a graphics information correspondence 300. As shown in FIG. 3, screen 301 includes display regions 302, 304-1, 304-2, and 305. Screen 301 may include the usable display area on a display 145-$n$. Graphics buffer 201 includes buffer regions 202-$q$. Also shown are two buffer region subsets 303-1 and 303-2. Buffer region subset 303-1 includes buffer regions 202-4, 202-5, 202-6, and 202-7. Buffer region subset 303-2 includes buffer regions 202-9, 202-10, 202-11, and 202-12. As shown in FIG. 3, buffer region subset 303-1 corresponds to display region 302, and thus buffer regions within buffer region subset 303-1 define the visual effects to be rendered within display region 302. Similarly, buffer region subset 303-2 corresponds to display region 304-2, and thus buffer regions within buffer region subset 303-2 define the visual effects to be rendered within display region 304-2. Buffer regions 202-4, 202-5, 202-6, and 202-7 have been shaded in order to indicate that they include updated graphics information 109. As illustrated by the corresponding shading of display region 302, this updated graphics information 109 corresponds to changes in the visual effects to be rendered in display region 302. In various embodiments, display region 302 may include an active window of a user interface, display regions 304-1 and 304-2 may include inactive windows of the user interface, and display region 305 may include a desktop of the user interface. In some embodiments, graphics management module 112 may determine the buffer regions 202-q that contain updated graphics information 109 by tracking regions of the user interface to determine the regions in which there are changes in the visual effects to be rendered. The embodiments are not limited in this context.

Figure 4:
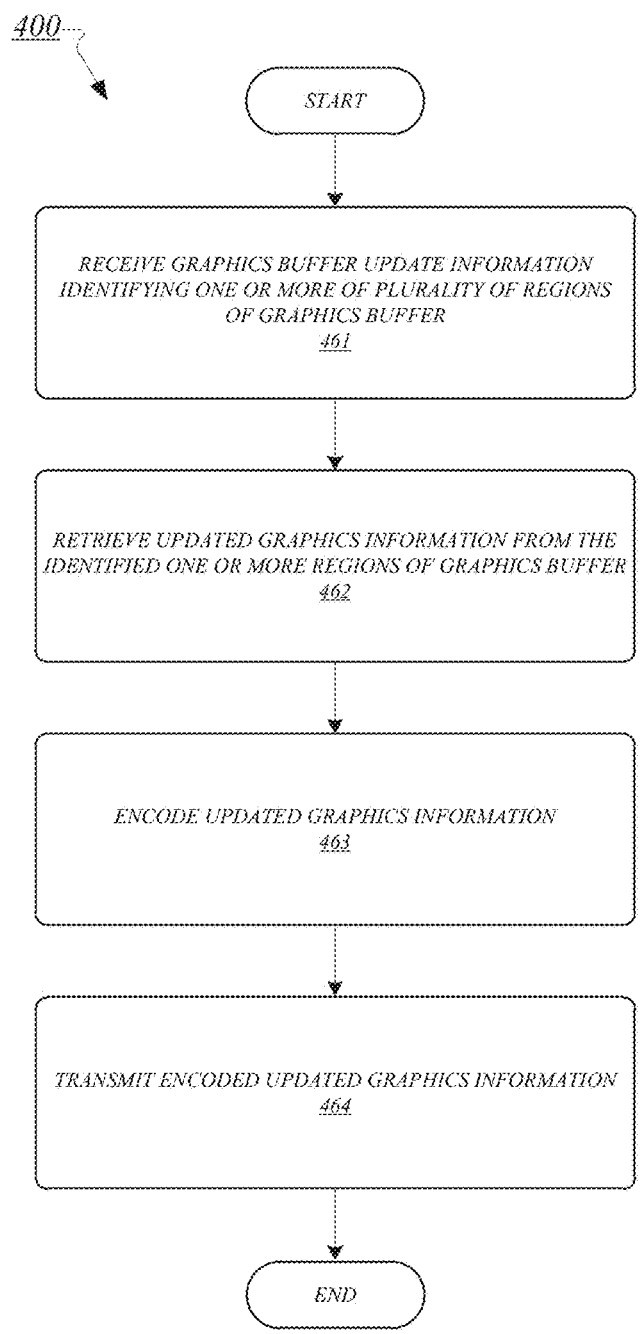
FIG. 4 illustrates one embodiment of a first logic flow.

FIG. 4 illustrates one embodiment of a logic flow 400, which may be representative of the operations executed by one or more embodiments described herein. As shown in logic flow 400, graphics buffer update information identifying one or more regions of a graphics buffer may be received at 461. For example, graphics encoding module 114 of FIG. 1 may receive graphics buffer update information 113 from graphics management module 112. At 462, updated graphics information may be retrieved from the identified one or more regions of the graphics buffer. For example, graphics encoding module 114 of FIG. 1 may retrieve updated graphics information 109 from graphics buffer 110. At 463, the updated graphics information may be encoded. For example, graphics encoding module 114 of FIG. 1 may encode updated graphics information 109 to form encoded updated graphics information 115. At 464, encoded updated graphics information may be transmitted. For example, device 100 and/or system 140 of FIG. 1 may transmit encoded updated graphics information 115 using transceiver 144. The embodiments are not limited to these examples.

Figure 5:
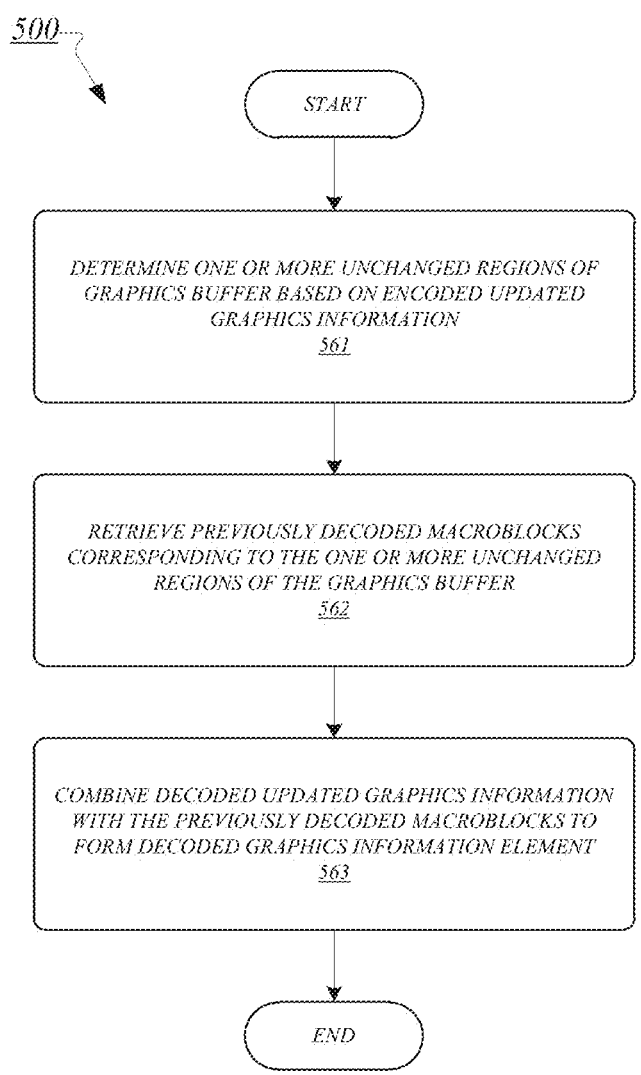
FIG. 5 illustrates one embodiment of a second logic flow.

FIG. 5 illustrates one embodiment of a logic flow 500, which may be representative of the operations executed by one or more embodiments described herein. As shown in logic flow 500, one or more unchanged regions of a graphics buffer may be determined based on encoded updated graphics information at 561. For example, graphics decoding module 116 of FIG. 1 may determine one or more unchanged regions of graphics buffer 110 based on encoded updated graphics information 115. At 562, previously decoded macroblocks corresponding to the one or more unchanged regions of the graphics buffer may be retrieved. For example, graphics decoding module 116 of FIG. 1 may retrieve previously decoded graphics information 119 from reference buffer 125, and previously decoded graphics information 119 may include previously decoded macroblocks corresponding to the one or more unchanged regions of graphics buffer 110. At 563, decoded updated graphics information may be combined with the previously decoded macroblocks to form a decoded graphics information element. For example, graphics decoding module 116 of FIG. 1 may combine decoded updated graphics information 118 with previously decoded graphics information 119 to form decoded graphics information element 120. The embodiments are not limited in this context.

Figure 6:
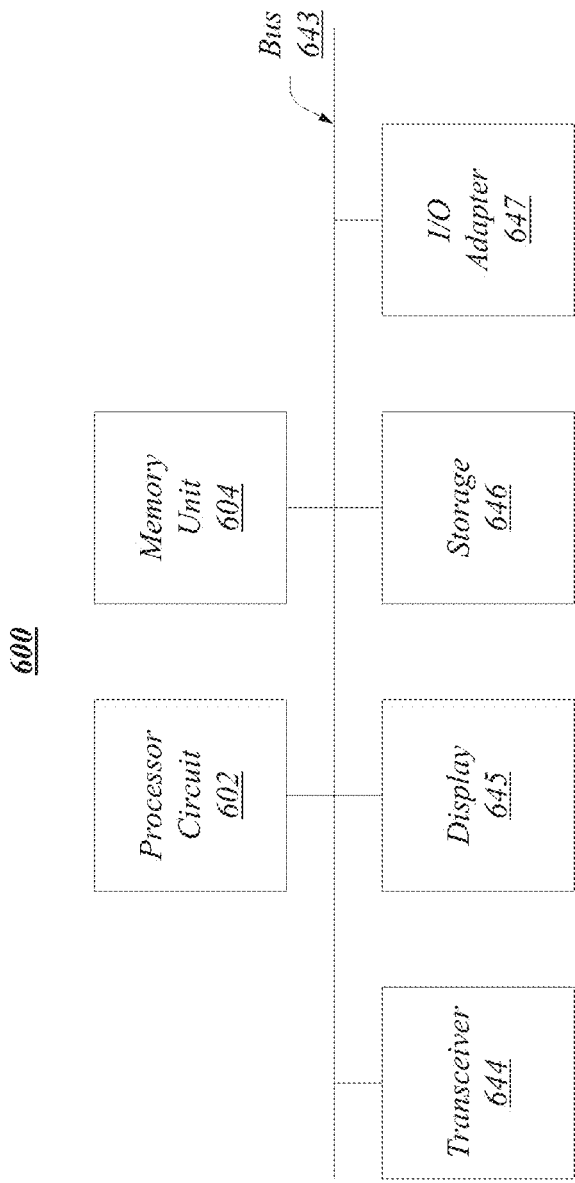
FIG. 6 illustrates one embodiment of a second system.

FIG. 6 illustrates one embodiment of a system 600. In various embodiments, system 600 may be representative of a system or architecture suitable for use with one or more embodiments described herein, such as device 100 and/or system 140 of FIG. 1, logic flow 400 of FIG. 4, and/or logic flow 500 of FIG. 5. The embodiments are not limited in this respect.

As shown in FIG. 6, system 600 may include multiple elements. One or more elements may be implemented using one or more circuits, components, registers, processors, software subroutines, modules, or any combination thereof, as desired for a given set of design or performance constraints. Although FIG. 6 shows a limited number of elements in a certain topology by way of example, it can be appreciated that more or less elements in any suitable topology may be used in system 600 as desired for a given implementation. The embodiments are not limited in this context.

In various embodiments, system 600 may include a processor circuit 602. Processor circuit 602 may be implemented using any processor or logic device, and may be the same as or similar to processor circuit 102 of FIG. 1.

In one embodiment, system 600 may include a memory unit 604 to couple to processor circuit 602. Memory unit 604 may be coupled to processor circuit 602 via communications bus 643, or by a dedicated communications bus between processor circuit 602 and memory unit 604, as desired for a given implementation. Memory unit 604 may be implemented using any machine-readable or computer-readable media capable of storing data, including both volatile and non-volatile memory, and may be the same as or similar to memory unit 104 of FIG. 1. In some embodiments, the machine-readable or computer-readable medium may include a non-transitory medium. The embodiments are not limited in this context.

In various embodiments, system 600 may include a transceiver 644. Transceiver 644 may include one or more radios capable of transmitting and receiving signals using various suitable wireless communications techniques, and may be the same as or similar to transceiver 144 of FIG. 1. The embodiments are not limited in this context.

In various embodiments, system 600 may include a display 645. Display 645 may include any television type monitor or display. Display 645 may include any display device capable of displaying information received from processor circuit 602, and may be the same as or similar to displays 145-n of FIG. 1. The embodiments are not limited in this context.

In various embodiments, system 600 may include storage 646. Storage 646 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 646 may include technology to increase the storage performance enhanced protection for valuable digital media when multiple hard drives are included, for example. Further examples of storage 646 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, system 600 may include one or more I/O adapters 647. Examples of I/O adapters 647 may include Universal Serial Bus (USB) ports/adapters, IEEE 1394 Firewire ports/adapters, and so forth. The embodiments are not limited in this context.

Figure 7:
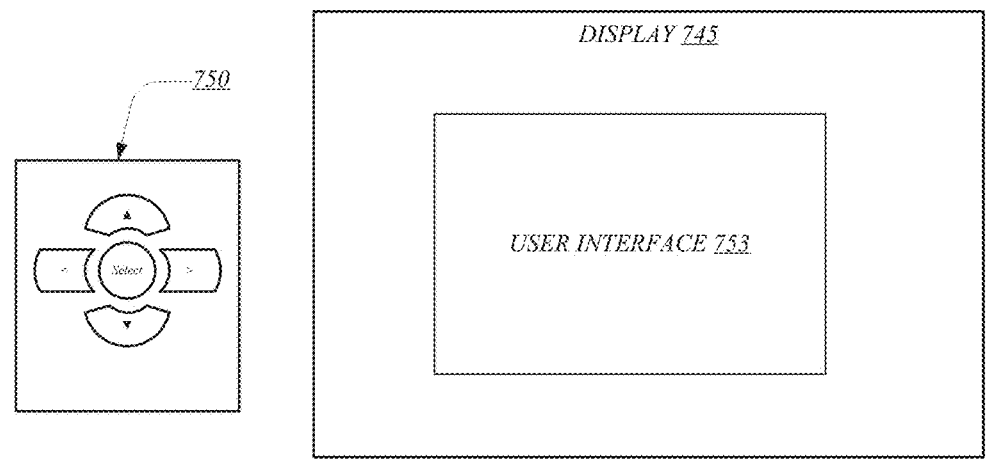
FIG. 7 illustrates one embodiment of a third system.
Figure 7:
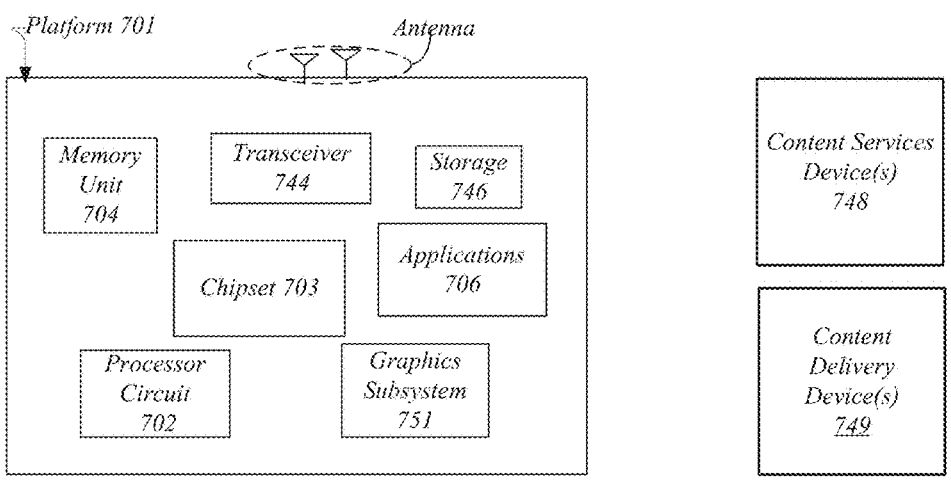
Figure 7:

FIG. 7 illustrates an embodiment of a system 700. In various embodiments, system 700 may be representative of a system or architecture suitable for use with one or more embodiments described herein, such as device 100 and/or system 140 of FIG. 1, logic flow 400 of FIG. 4, logic flow 500 of FIG. 5, and/or system 600 of FIG. 6. The embodiments are not limited in this respect.

As shown in FIG. 7, system 700 may include multiple elements. One or more elements may be implemented using one or more circuits, components, registers, processors, software subroutines, modules, or any combination thereof, as desired for a given set of design or performance constraints. Although FIG. 7 shows a limited number of elements in a certain topology by way of example, it can be appreciated that more or less elements in any suitable topology may be used in system 700 as desired for a given implementation. The embodiments are not limited in this context.

In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 includes a platform 701 coupled to a display 745. Platform 701 may receive content from a content device such as content services device(s) 748 or content delivery device(s) 749 or other similar content sources. A navigation controller 750 including one or more navigation features may be used to interact with, for example, platform 701 and/or display 745. Each of these components is described in more detail below.

In embodiments, platform 701 may include any combination of a processor circuit 702, chipset 703, memory unit 704, transceiver 744, storage 746, applications 751, and/or graphics subsystem 752. Chipset 703 may provide intercommunication among processor circuit 702, memory unit 704, transceiver 744, storage 746, applications 751, and/or graphics subsystem 752. For example, chipset 703 may include a storage adapter (not depicted) capable of providing intercommunication with storage 746.

Processor circuit 702 may be implemented using any processor or logic device, and may be the same as or similar to processor circuit 602 in FIG. 6.

Memory unit 704 may be implemented using any machine-readable or computer-readable media capable of storing data, and may be the same as or similar to memory unit 604 in FIG. 6.

Transceiver 744 may include one or more radios capable of transmitting and receiving signals using various suitable wireless communications techniques, and may be the same as or similar to transceiver 644 in FIG. 6.

Display 745 may include any television type monitor or display, and may be the same as or similar to display 645 in FIG. 6.

Storage 746 may be implemented as a non-volatile storage device, and may be the same as or similar to storage 646 in FIG. 6.

Graphics subsystem 752 may perform processing of images such as still or video for display. Graphics subsystem 752 may be a graphics processing unit (GPU) or a visual processing unit (VPU), for example. An analog or digital interface may be used to communicatively couple graphics subsystem 752 and display 745. For example, the interface may be any of a High-Definition Multimedia Interface, DisplayPort, wireless HDMI, and/or wireless HD compliant techniques. Graphics subsystem 752 could be integrated into processor circuit 702 or chipset 703. Graphics subsystem 752 could be a stand-alone card communicatively coupled to chipset 703.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

In embodiments, content services device(s) 748 may be hosted by any national, international and/or independent service and thus accessible to platform 701 via the Internet, for example. Content services device(s) 748 may be coupled to platform 701 and/or to display 745. Platform 701 and/or content services device(s) 748 may be coupled to a network 753 to communicate (e.g., send and/or receive) media information to and from network 753. Content delivery device(s) 749 also may be coupled to platform 701 and/or to display 745.

In embodiments, content services device(s) 748 may include a cable television box, personal computer, network, telephone, Internet enabled devices or appliance capable of delivering digital information and/or content, and any other similar device capable of unidirectionally or bidirectionally communicating content between content providers and platform 701 and/display 745, via network 753 or directly. It will be appreciated that the content may be communicated unidirectionally and/or bidirectionally to and from any one of the components in system 700 and a content provider via network 753. Examples of content may include any media information including, for example, video, music, medical and gaming information, and so forth.

Content services device(s) 748 receives content such as cable television programming including media information, digital information, and/or other content. Examples of content providers may include any cable or satellite television or radio or Internet content providers. The provided examples are not meant to limit embodiments of the invention.

In embodiments, platform 701 may receive control signals from navigation controller 750 having one or more navigation features. The navigation features of navigation controller 750 may be used to interact with a user interface 754, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 750 may be echoed on a display (e.g., display 745) by movements of a pointer, cursor, focus ring, or other visual indicators displayed on the display. For example, under the control of software applications 751, the navigation features located on navigation controller 750 may be mapped to virtual navigation features displayed on user interface 754. In embodiments, navigation controller 750 may not be a separate component but integrated into platform 701 and/or display 745. Embodiments, however, are not limited to the elements or in the context shown or described herein.

In embodiments, drivers (not shown) may include technology to enable users to instantly turn on and off platform 701 like a television with the touch of a button after initial boot-up, when enabled, for example. Program logic may allow platform 701 to stream content to media adaptors or other content services device(s) 748 or content delivery device(s) 749 when the platform is turned "off." In addition, chip set 703 may include hardware and/or software support for 5.1 surround sound audio and/or high definition 7.1 surround sound audio, for example. Drivers may include a graphics driver for integrated graphics platforms. In embodiments, the graphics driver may include a peripheral component interconnect (PCI) Express graphics card.

In various embodiments, any one or more of the components shown in system 700 may be integrated. For example, platform 701 and content services device(s) 748 may be integrated, or platform 701 and content delivery device(s) 749 may be integrated, or platform 701, content services device(s) 748, and content delivery device(s) 749 may be integrated, for example. In various embodiments, platform 701 and display 745 may be an integrated unit. Display 745 and content service device(s) 748 may be integrated, or display 745 and content delivery device(s) 749 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as I/O adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 701 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 7.

Figure 8:
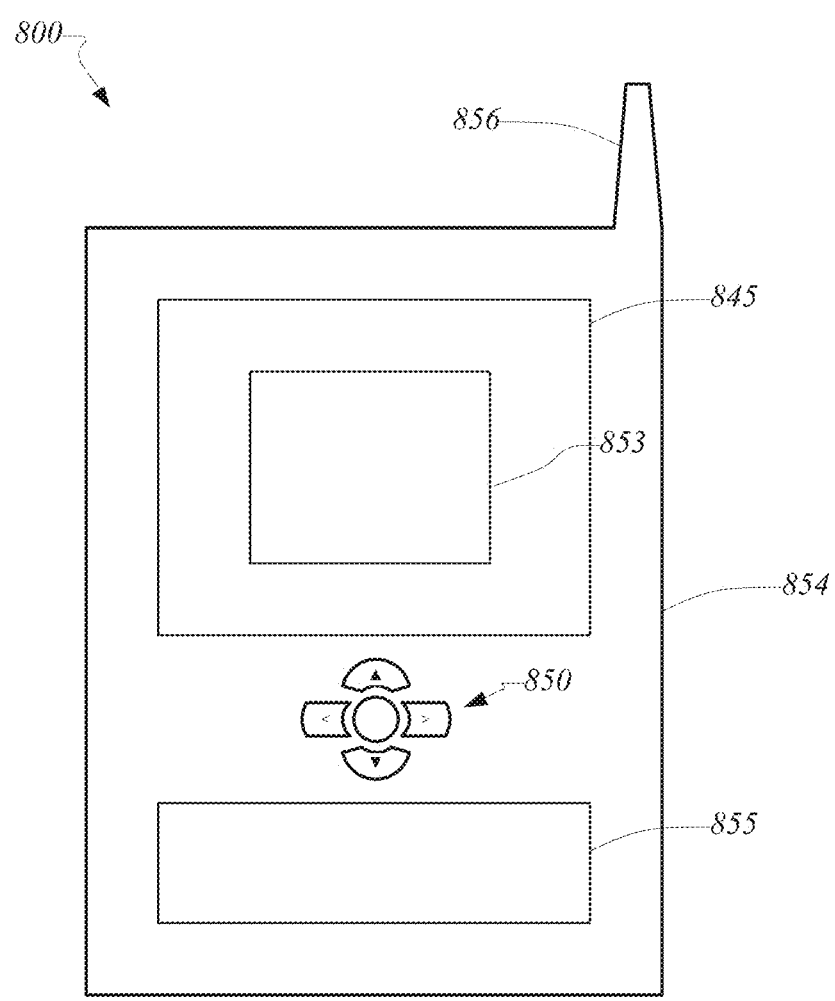
FIG. 8 illustrates one embodiment of a device.

As described above, system 700 may be embodied in varying physical styles or form factors. FIG. 8 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 8, device 800 may include a display 845, a navigation controller 850, a user interface 854, a housing 855, an I/O device 856, and an antenna 857. Display 845 may include any suitable display unit for displaying information appropriate for a mobile computing device, and may be the same as or similar to display 745 in FIG. 7. Navigation controller 850 may include one or more navigation features which may be used to interact with user interface 854, and may be the same as or similar to navigation controller 750 in FIG. 7. I/O device 856 may include any suitable I/O device for entering information into a mobile computing device. Examples for I/O device 856 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or rewriteable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

A computer-implemented method may comprise receiving graphics buffer update information identifying one or more of a plurality of regions of a graphics buffer, the identified one or more regions comprising updated graphics information, retrieving the updated graphics information from the identified one or more regions of the graphics buffer, encoding the updated graphics information, and transmitting the encoded updated graphics information.

According to such a computer-implemented method, the encoded updated graphics information may comprise one or more encoded macroblocks.

According to such a computer-implemented method, each of the one or more encoded macroblocks may correspond to one or more of the identified one or more regions of the graphics buffer.

According to such a computer-implemented method, the graphics buffer may comprise graphics information describing a current frame, and the one or more encoded macroblocks may correspond to changed macroblocks in the current frame.

Such a computer-implemented method may comprise transmitting the encoded updated graphics information over a wireless connection to a wireless display.

According to such a computer-implemented method, the encoded updated graphics information may be usable by the wireless display to generate decoded updated graphics information comprising decoded updated macroblocks.

According to such a computer-implemented method, the encoded updated graphics information may be usable by the wireless display to generate a decoded graphics information element comprising the decoded updated graphics information.

According to such a computer-implemented method, the encoded updated graphics information may be usable by the wireless display to retrieve previously decoded graphics information based on the encoded updated graphics information, generate decoded updated graphics information based on the encoded updated graphics information, and combine the decoded updated graphics information with the previously decoded graphics information to form the decoded graphics information element.

According to such a computer-implemented method, the previously decoded graphics information may comprise previously decoded macroblocks, the decoded graphics information element comprising a decoded graphics frame.

According to such a computer-implemented method, the graphics buffer may comprise a framebuffer.

According to such a computer-implemented method, the updated graphics information may correspond to visual effects of a user interface.

According to such a computer-implemented method, the updated graphics information may correspond to visual effects within in active window of the user interface.

According to such a computer-implemented method, to encode the updated graphics information may be to perform interframe motion vector estimation.

According to such a computer-implemented method, to encode the updated graphics information may be to perform H.264 encoding.

An apparatus may comprise a processor circuit and a graphics encoding module operative to access graphics buffer update information identifying one or more of a plurality of regions of a graphics buffer, the identified one or more regions comprising updated graphics information, retrieve the updated graphics information from the identified one or more regions of the graphics buffer, encode the updated graphics information, and transmit the encoded updated graphics information.

With respect to such an apparatus, the encoded updated graphics information may comprise one or more encoded macroblocks.

With respect to such an apparatus, each of the one or more encoded macroblocks may correspond to one or more of the identified one or more regions of the graphics buffer.

In such an apparatus, the graphics buffer may comprise graphics information describing a current frame, and the one or more encoded macroblocks may correspond to changed macroblocks in the current frame.

Such an apparatus may be operative to transmit the encoded updated graphics information over a wireless connection to a wireless display.

With respect to such an apparatus, the encoded updated graphics information may be usable by the wireless display to generate decoded updated graphics information comprising decoded updated macroblocks.

With respect to such an apparatus, the encoded updated graphics information may be usable by the wireless display to generate a decoded graphics information element comprising the decoded updated graphics information.

With respect to such an apparatus, the encoded updated graphics information may be usable by the wireless display to retrieve previously decoded graphics information based on the encoded updated graphics information, generate decoded updated graphics information based on the encoded updated graphics information, and combine the decoded updated graphics information with the previously decoded graphics information to form the decoded graphics information element.

With respect to such an apparatus, the previously decoded graphics information may comprise previously decoded macroblocks, the decoded graphics information element comprising a decoded graphics frame.

With respect to such an apparatus, the graphics buffer may comprise a framebuffer.

With respect to such an apparatus, the updated graphics information may correspond to visual effects of a user interface.

With respect to such an apparatus, the updated graphics information may correspond to visual effects within in active window of the user interface.

With respect to such an apparatus, to encode the updated graphics information may be to perform interframe motion vector estimation.

With respect to such an apparatus, to encode the updated graphics information may be to perform H.264 encoding.

A system may comprise such an apparatus and an audio device communicatively coupled to the processor circuit within such an apparatus.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method, comprising:
receiving graphics buffer update information from a graphics driver at a graphics encoder;
identifying, by the graphics encoder, one or more of a plurality of regions of a graphics buffer that correspond to an active window within a user interface, based on the graphics buffer update information, the identified one or more of a plurality of regions comprising updated graphics information, wherein the updated graphics information comprises two or more consecutive regions within a single column of the graphics buffer;
retrieving, by the graphics encoder, the updated graphics information from the identified one or more regions of the graphics buffer that correspond to the active window within the user interface;
encoding, by the graphics encoder, the updated graphics information in an encoding format specified by a wireless display specification, the updated graphics information including one or more motion vectors; and
transmitting encoded updated graphics information over a wireless connection to a wireless display in accordance with the wireless display specification, the encoded updated graphics information usable by the wireless display to generate decoded updated graphics information comprising decoded updated macroblocks.

2. The computer-implemented method of claim 1, the encoded updated graphics information comprising one or more encoded macroblocks.

3. The computer-implemented method of claim 2, each of the one or more encoded macroblocks corresponding to one or more of the identified one or more of a plurality of regions of the graphics buffer.

4. The computer-implemented method of claim 3, the graphics buffer comprising graphics information describing a current frame, the one or more encoded macroblocks corresponding to changed macroblocks in the current frame.

5. The computer-implemented method of claim 1, the encoded updated graphics information usable by the wireless display to generate a decoded graphics information element comprising the decoded updated graphics information.

6. The computer-implemented method of claim 5, the encoded updated graphics information usable by the wireless display to:
retrieve previously decoded graphics information based on the encoded updated graphics information;
generate the decoded updated graphics information based on the encoded updated graphics information; and
combine the decoded updated graphics information with the previously decoded graphics information to form the decoded graphics information element.

7. The computer-implemented method of claim 6, the previously decoded graphics information comprising previously decoded macroblocks, the decoded graphics information element comprising a decoded graphics frame.

8. The computer-implemented method of claim 1, the updated graphics information corresponding to one of visual effects of the user interface or visual effects within the active window of the user interface.

9. The computer-implemented method of claim 1, wherein to encode the updated graphics information is to perform one of interframe motion vector estimation or H.264 encoding.

10. An apparatus, comprising:
a processor circuit to execute a graphics application operative to generate graphics information to be stored in a graphics buffer; and
a graphics encoder communicatively coupled to the graphics buffer, the graphics encoder operative to:
identify, based on received graphics buffer update information, one or more of a plurality of regions of the graphics buffer that correspond to an active window within a user interface, the identified one or more of a plurality of regions comprising updated graphics information, wherein the updated graphics information comprises two or more consecutive regions within a single column of the graphics buffer;
retrieve the updated graphics information from the identified one or more regions of the graphics buffer that correspond to the active window within the user interface;
encode the updated graphics information in an encoding format specified by a wireless display specification, the updated graphics information including one or more motion vectors; and
transmit encoded updated graphics information over a wireless connection to a wireless display in accordance with the wireless display specification, the encoded updated graphics information usable by the wireless display to generate decoded updated graphics information comprising decoded updated macroblocks.

11. The apparatus of claim 10, the encoded updated graphics information comprising one or more encoded macroblocks.

12. The apparatus of claim 11, each of the one or more encoded macroblocks corresponding to one or more of the identified one or more of a plurality of regions of the graphics buffer.

13. The apparatus of claim 12, the graphics buffer comprising graphics information describing a current frame, the one or more encoded macroblocks corresponding to changed macroblocks in the current frame.

14. The apparatus of claim 10, the encoded updated graphics information usable by the wireless display to generate a decoded graphics information element comprising the decoded updated graphics information.

15. The apparatus of claim 14, the encoded updated graphics information usable by the wireless display to:
retrieve previously decoded graphics information based on the encoded updated graphics information;
generate the decoded updated graphics information based on the encoded updated graphics information; and
combine the decoded updated graphics information with the previously decoded graphics information to form the decoded graphics information element.

16. The apparatus of claim 15, the previously decoded graphics information comprising previously decoded macroblocks, the decoded graphics information element comprising a decoded graphics frame.

17. The apparatus of claim 10, the graphics buffer comprising a frame buffer.

18. The apparatus of claim 10, the updated graphics information corresponding to one of visual effects of the user interface or visual effects of the active window of the user interface.

19. The apparatus of claim 10, wherein to encode the updated graphics information is to perform one of interframe motion vector estimation and H.264 encoding.

20. A system, comprising:
a processor circuit to execute a graphics application operative to generate graphics information to be stored in a graphics buffer;
an audio device communicatively coupled to the processor circuit; and
a graphics encoder communicatively coupled to the graphics buffer, the graphics encoder operative to:
identify, based on received graphics buffer update information, one or more of a plurality of regions of the graphics buffer that correspond to an active window within a user interface, the identified one or more of a plurality of regions comprising updated graphics information, wherein the updated graphics information comprises two or more consecutive regions within a single column of the graphics buffer;
retrieve the updated graphics information from the identified one or more regions of the graphics buffer that correspond to the active window within the user interface;
encode the updated graphics information in an encoding format specified by a wireless display specification, the updated graphics information including one or more motion vectors; and
transmit encoded updated graphics information over a wireless connection to a wireless display in accordance with the wireless display specification, the encoded updated graphics information usable by the wireless display to generate decoded updated graphics information comprising decoded updated macroblocks.

21. The system of claim 20, the encoded updated graphics information comprising one or more encoded macroblocks, each of the one or more encoded macroblocks corresponding to one or more of the identified one or more of a plurality of regions of the graphics buffer.

* * * * *